(12) United States Patent
Shimizu et al.

(10) Patent No.: US 9,641,602 B2
(45) Date of Patent: May 2, 2017

(54) SERVICE PROVISION SYSTEM

(71) Applicant: Clarion Co., Ltd., Saitama-shi, Saitama (JP)

(72) Inventors: Atsushi Shimizu, Tokyo (JP); Yasushi Nagai, Tokyo (JP); Takashi Matsumoto, Tokyo (JP); Hiroyoshi Endo, Saitama (JP); Tatsuaki Osafune, Tokyo (JP); Haruhiko Sawajiri, Saitama (JP)

(73) Assignee: CLARION CO., LTD., Saitama (JP)

( * ) Notice: Subject to any disclaimer, the term of this patent is extended or adjusted under 35 U.S.C. 154(b) by 245 days.

(21) Appl. No.: 14/405,476

(22) PCT Filed: May 15, 2013

(86) PCT No.: PCT/JP2013/063552
§ 371 (c)(1),
(2) Date: Dec. 4, 2014

(87) PCT Pub. No.: WO2013/187175
PCT Pub. Date: Dec. 19, 2013

(65) Prior Publication Data
US 2015/0142865 A1 May 21, 2015

(30) Foreign Application Priority Data
Jun. 13, 2012 (JP) ................................. 2012-133945

(51) Int. Cl.
*H04L 29/08* (2006.01)
*G06F 21/62* (2013.01)
*G06F 11/30* (2006.01)

(52) U.S. Cl.
CPC .............. *H04L 67/10* (2013.01); *G06F 11/30* (2013.01); *G06F 21/6254* (2013.01);
(Continued)

(58) Field of Classification Search
CPC ..... H04L 67/10–67/1029; H04L 67/16–67/18; H04L 67/303–67/306; G06F 21/60–21/629
See application file for complete search history.

(56) References Cited

U.S. PATENT DOCUMENTS

| 2004/0148525 A1 | 7/2004 | Aida et al. |
| 2008/0010215 A1 | 1/2008 | Rackley, III et al. |
| 2011/0093327 A1* | 4/2011 | Fordyce, III ........... G06Q 20/10 705/14.39 |

FOREIGN PATENT DOCUMENTS

| JP | 2004-178517 A | 6/2004 |
| JP | 2006-018361 A | 1/2006 |
| JP | 2007-179124 A | 7/2007 |

OTHER PUBLICATIONS

European Search Report dated May 16, 2016 for Appln. No. 13804887.1.
(Continued)

*Primary Examiner* — Nicholas Taylor
*Assistant Examiner* — Clayton R Williams
(74) *Attorney, Agent, or Firm* — Volpe and Koenig, P.C.

(57) ABSTRACT

A service provision system comprises a first terminal, a service computer, and a user registration module. The first terminal includes an application management module to which second identification information is assigned, for managing the application to which first identification information is assigned, and an anonymous personal data transmission module for transmitting the anonymous personal data including the first identification information and the second identification information. The user registration module transmits user registration data including the second identification information and third identification information, in a case of inputting third identification information. The service computer stores, in a case of receiving the
(Continued)

anonymous personal data, the first identification information, the second identification information, and the anonymous personal data in association with each other, and stores, in a case of receiving the user registration data, the second identification information and the third identification information in association with each other.

11 Claims, 12 Drawing Sheets

(52) U.S. Cl.
CPC ............ *H04L 67/16* (2013.01); *H04L 67/306* (2013.01); *G06F 2221/2117* (2013.01)

(56) References Cited

OTHER PUBLICATIONS

P. Leach et al., "A Universally Unique Identifier (UUID) URN Namespace", Net Working Group, Request for Comments, 4122, Category: Standards Track, Jul. 2005.

* cited by examiner

| 171 | 172 | 173 | 17 |
|---|---|---|---|
| VIRTUAL DEVICE ID | APPLICATION ID | ANONYMOUS PERSONAL DATA | |
| A | 1 | ..... | |
| A | 2 | ..... | |

FIG. 4

| 181 | 182 |
|---|---|
| USER ID | VIRTUAL DEVICE ID |
| ABCD | A |
| EFGH | B |

FIG. 5

| USER ID | VIRTUAL DEVICE ID | APPLICATION ID |
|---------|-------------------|----------------|
| ABCD    | A                 | 1              |
| EFGH    | B                 | 3, 4           |

FIG. 10

| SERVICE ID | VIRTUAL DEVICE ID | APPLICATION ID |
|---|---|---|
| SERVICE A | A | 1 |
| | B | 3 |
| .... | .... | .... |

*FIG. 12*

| RANK | SERVICE ID |
|---|---|
| RANK A | SERVICE A |
| | SERVICE B |
| RANK B | SERVICE A |
| | SERVICE B |
| | SERVICE C |
| .... | .... |

*FIG. 13*

SERVICE PROVISION SYSTEM

INCORPORATE BY REFERENCE

The present application claims priority of Japanese Patent Application JP 2012-133945 filed on Jun. 13, 2012, the content of which is hereby incorporated by reference into this application.

BACKGROUND OF THE INVENTION

This invention relates to a service provision system for providing a service to the user, and more particularly, to a service provision system in which anonymous personal data generated in order to provide the service before user registration is taken over after the user registration.

There is demand that, when a user uses a plurality of communication terminals, personal data on one terminal be synchronized with that on the other terminal. JP 2004-178517 A is known as a technology for thus synchronizing the personal data.

In JP 2004-178517 A, there is a description (refer to Abstract) "in the method with which a user terminal (11) to be used by the user and one or more notify party terminals (21 to 23) to which the user's personal information, etc. should be told are connected via a network and the personal information, etc. are transmitted from the user terminal (11) to the notifying destination terminals, when the user selectively uses the user terminal (11) and a user terminal (12), it has a first step of the user terminal (11) transmitting the personal information, etc. to a user terminal (12), a second step of the user terminal (12) synchronizing and updating personal information, etc. held by itself on the basis of the received personal information, etc. and a third step of the user terminal (12) transmitting the personal information, etc. to the notifying destination terminal."

On the other hand, there is demand for a system in which a service server for providing a service to a user stores anonymous personal data for providing the service without requesting the user for a user ID or a password and provides the service to the user, to thereby eliminate the need for the user to perform an operation for user registration.

SUMMARY OF THE INVENTION

Such a system needs to employ a mechanism in which, when the user performs the user registration on the service server, the personal data on the user before the user registration can be used after the user registration.

JP 2004-178517 A discloses a method of synchronizing terminal-independent data registered on one terminal with that on the other terminal via a server, while disclosing none of methods in which the personal data before the user registration is taken over after the user registration.

This invention has been made in order to solve the above-mentioned problem. Specifically, it is an object of this invention is to enable personal data on a user before user registration to be used after the user registration.

The representative one of inventions disclosed in this application is outlined as follows. There is provided a service provision system for providing a service to a user, comprising: a first terminal used by the user; a service computer for providing the service and storing anonymous personal data received from the first terminal; and a user registration module for receiving an input for user registration, wherein: the first terminal includes: an application execution module for providing the service and executing an application to which first identification information is assigned; an application management module to which second identification information is assigned, for managing the application; and an anonymous personal data transmission module for transmitting the anonymous personal data generated by the application execution module executing the application to the service computer by including therein the first identification information and the second identification information; the user registration module acquires the second identification information in a case where third identification information serving as identification information on the user is input for the user registration, and transmits user registration data including the acquired second identification information and the input third identification information to the service computer; and the service computer includes: an anonymous personal data storage module for storing, in a case of receiving the anonymous personal data transmitted by the anonymous personal data transmission module, the first identification information and the second identification information that are included in the anonymous personal data and the anonymous personal data in a storage area in association with each other; and an anonymous personal data consolidation module for storing, in a case of receiving the user registration data transmitted by the user registration module, the second identification information and the third identification information that are included in the user registration data in association with each other, to thereby consolidate the anonymous personal data into the third identification information.

An effect of the exemplary embodiment of the invention disclosed herein is summarized as follows. The personal data on a user before user registration is enabled to be used after the user registration.

BRIEF DESCRIPTION OF THE DRAWINGS

The present invention can be appreciated by the description which follows in conjunction with the following figures, wherein:

FIG. 4 is an explanatory diagram of anonymous personal data stored in an anonymous personal data storage module according to the first embodiment of this invention;

FIG. 5 is an explanatory diagram of a user registration management table according to the first embodiment of this invention;

FIG. 10 is an explanatory diagram of the user registration management table according to a modification example of the second embodiment of this invention;

FIG. 12 is an explanatory diagram of the service management table according to the modification example of the second embodiment of this invention;

FIG. 13 is an explanatory diagram of a rank management table according to the modification example of the second embodiment of this invention.

DETAILED DESCRIPTION OF THE PREFERRED EMBODIMENTS (First Embodiment)

A first embodiment of this invention is described with reference to FIG. 1 to FIG. 7.

In this embodiment, a description is made of takeover of anonymous personal data performed when user registration is performed from a terminal B 2 after a service provided by a service server 11 is used from a terminal A 1 without user registration, and anonymous personal data generated while no user registration has been performed is stored on the service server 11.

Figure 1:
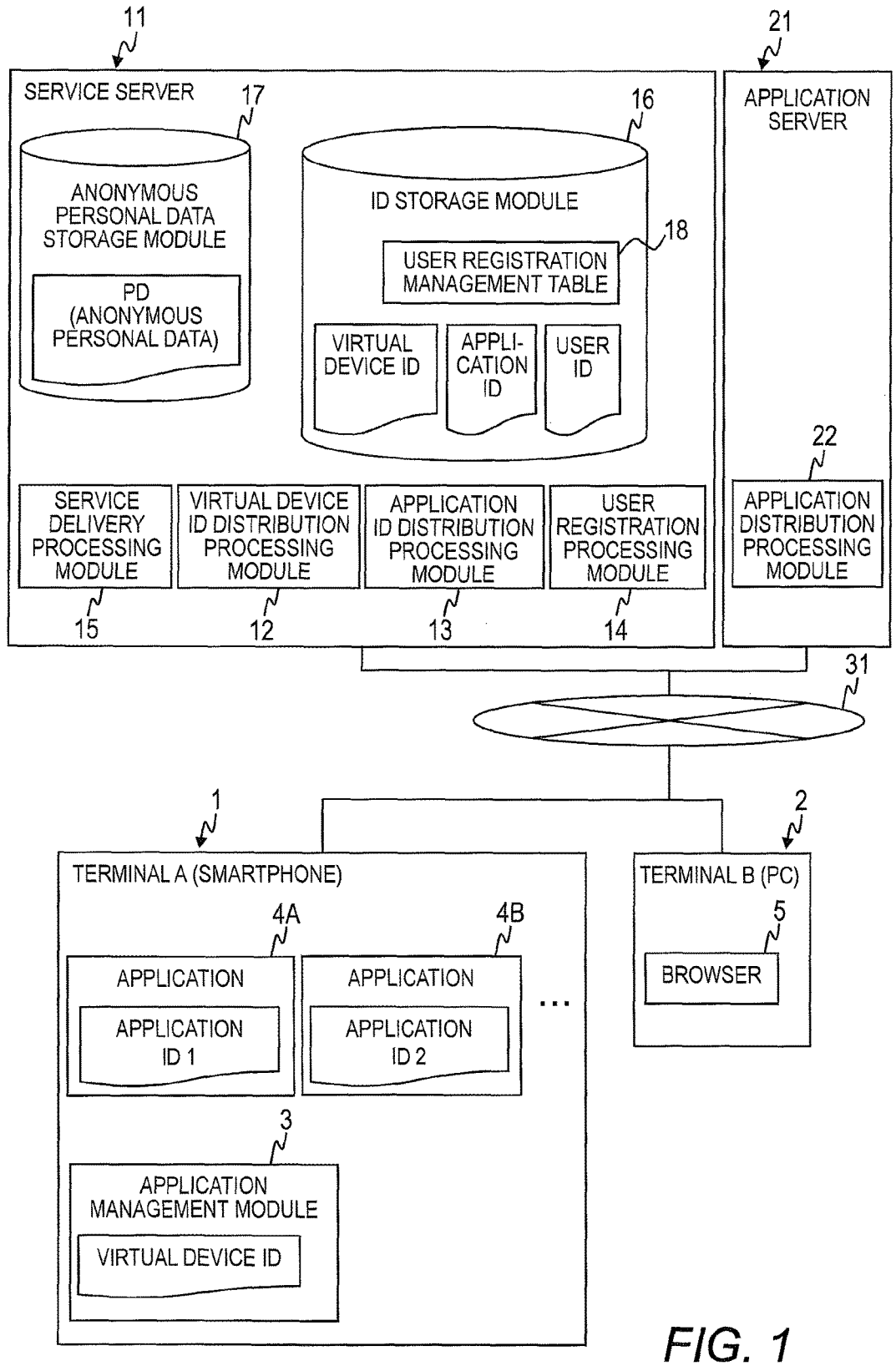
FIG. 1 is an explanatory diagram of a configuration of a service provision system according to a first embodiment of this invention.

FIG. 1 is an explanatory diagram of a configuration of a service provision system according to the first embodiment of this invention.

The service provision system includes the terminal A 1 (first terminal), the terminal B 2 (third terminal), the service server 11, and an application server 21. The terminal A 1, the terminal B 2, the service server 11, and the application server 21 are coupled to each other via a communication line 31 such as the Internet.

The terminal A 1 executes applications 4A and 4B (hereinafter referred to collectively as "application 4") for providing a service to a user. Further, the terminal A 1 includes an application management module 3 for managing the application 4. An application ID (first identification information) serving as unique identification information is assigned to the application 4, and a virtual device ID (second identification information) serving as unique identification information is assigned to the application management module 3.

The terminal B 2 includes a browser 5. The browser 5 is coupled to the service server 11, displays the anonymous personal data stored in an anonymous personal data storage module 17 of the service server 11, and receives an input of information to be transmitted to the service server 11. In other words, in this embodiment, the terminal B 2 functions as a user registration module for receiving the input of information regarding the user registration.

The terminal A 1 is a terminal that can use a service without requiring the user registration on the service server 11, for example, a mobile terminal such as a smartphone or an advanced mobile phone, or an in-vehicle terminal such as a car navigation system. Further, the terminal B 2 is a terminal that starts using a service after the user registration is performed for the service, for example, a terminal such as a PC.

The service server 11 includes a service delivery processing module 15, the anonymous personal data storage module 17, a virtual device ID distribution processing module 12, an application ID distribution processing module 13, a user registration processing module 14, and an ID storage module 16.

The service delivery processing module 15 delivers a service to the terminal A 1 and the terminal B 2. For example, the service delivery processing module 15 executes processing corresponding to the request made by the application 4 executed by the terminal A 1, and transmits a processing result to the terminal A 1, to thereby deliver a service thereto. The anonymous personal data storage module 17 is a storage area for storing the anonymous personal data on the user of the terminal A 1. The anonymous personal data storage module 17 is described in detail with reference to FIG. 4.

The virtual device ID distribution processing module 12 assigns a virtual device ID to the application management module 3 included in the terminal A 1. The application ID distribution processing module 13 assigns an application ID to the application 4. The user registration processing module 14 receives registration of a user ID (third identification information) serving as identification information on the user and a password from the terminal A 1 or the terminal B 2, and consolidates the anonymous personal data stored in the anonymous personal data storage module 17 into the user ID. The ID storage module 16 is a storage area for storing the virtual device ID, the application ID, the user ID, and a user registration management table 18. The user registration management table 18 is a table for associating the user ID with the virtual device ID when the user registration is performed, and details thereof are described with reference to FIG. 5.

The application server 21 includes an application distribution processing module 22. When receiving a distribution request for the application 4 transmitted by the terminal A 1, the application distribution processing module 22 transmits the application 4 for using a service on the service server 11 to the terminal A 1. Further, when receiving a distribution request for the application management module 3 transmitted by the terminal A 1, the application distribution processing module 22 transmits a program for implementing the application management module 3 to the terminal A 1.

The application 4 is described in detail.

When activated for the first time, the application 4 transmits an application ID acquisition request to the application ID distribution processing module 13. The terminal A 1 receives the application ID from the application ID distribution processing module 13, and assigns the received application ID to the application 4.

The application 4 may generate the application ID by itself when activated for the first time, to assign the generated application ID to itself. It should be noted that the application 4 may generate the application ID in a format conformed to a universal unique ID. It should be noted that the universal unique ID is described in detail in P. Leach, "A Universally Unique Identifier (UUID) URN Namespace", 2005.

Further, when transmitting the anonymous personal data to the service server 11, the application 4 acquires the virtual device ID assigned to the application management module 3, and transmits the acquired virtual device ID, the own application ID, and the anonymous personal data to the service server 11. The anonymous personal data represents personal data generated while no user registration has been performed.

The application management module 3 is described in detail.

When activated for the first time, the application management module 3 transmits a virtual device ID acquisition request to the virtual device ID distribution processing module 12. The terminal A 1 receives the virtual device ID from the virtual device ID distribution processing module 12, and assigns the received virtual device ID to the application management module 3.

The application management module 3 may generate the virtual device ID by itself when activated for the first time, to assign the generated virtual device ID to itself. It should be noted that the application management module 3 may generate the virtual device ID in a format conformed to a universal unique ID.

Further, the application management module 3 passes the virtual device ID to the application 4 when the user uses the application 4. Further, when receiving the input regarding the user registration, the application management module 3 transmits the virtual device ID to the user registration processing module 14.

When the user inputs information regarding the user registration to the terminal B 2, the browser 5 presents the user with a message for prompting the user to input the virtual device ID, and transmits user registration data including the input virtual device ID, the user ID, and the password to the service server 11. It should be noted that the following embodiments are described by assuming that the user registration data includes the password, but the user registration data may not necessarily include the password.

The service delivery processing module 15 stores the anonymous personal data transmitted from the application 4 of the terminal A 1 in the anonymous personal data storage module 17 in association with the virtual device ID and the application ID transmitted from the application 4.

When receiving the user registration data transmitted from the browser 5, the user registration processing module 14 associates the user ID and the virtual device ID that are included in the user registration data, and registers the information obtained by associating the user ID and the virtual device ID in the user registration management table 18.

Accordingly, the anonymous personal data that matches the virtual device ID included in the user registration data among the anonymous personal data stored in the anonymous personal data storage module 17 can be associated with the user ID, and the anonymous personal data can be consolidated into the user ID. In other words, the anonymous personal data before the user registration can be taken over also after the user registration.

FIG. 1 illustrates that the terminal A 1 executes the applications 4A and 4B, but in this embodiment, it suffices that the terminal A 1 executes at least one application 4.

Figure 2:
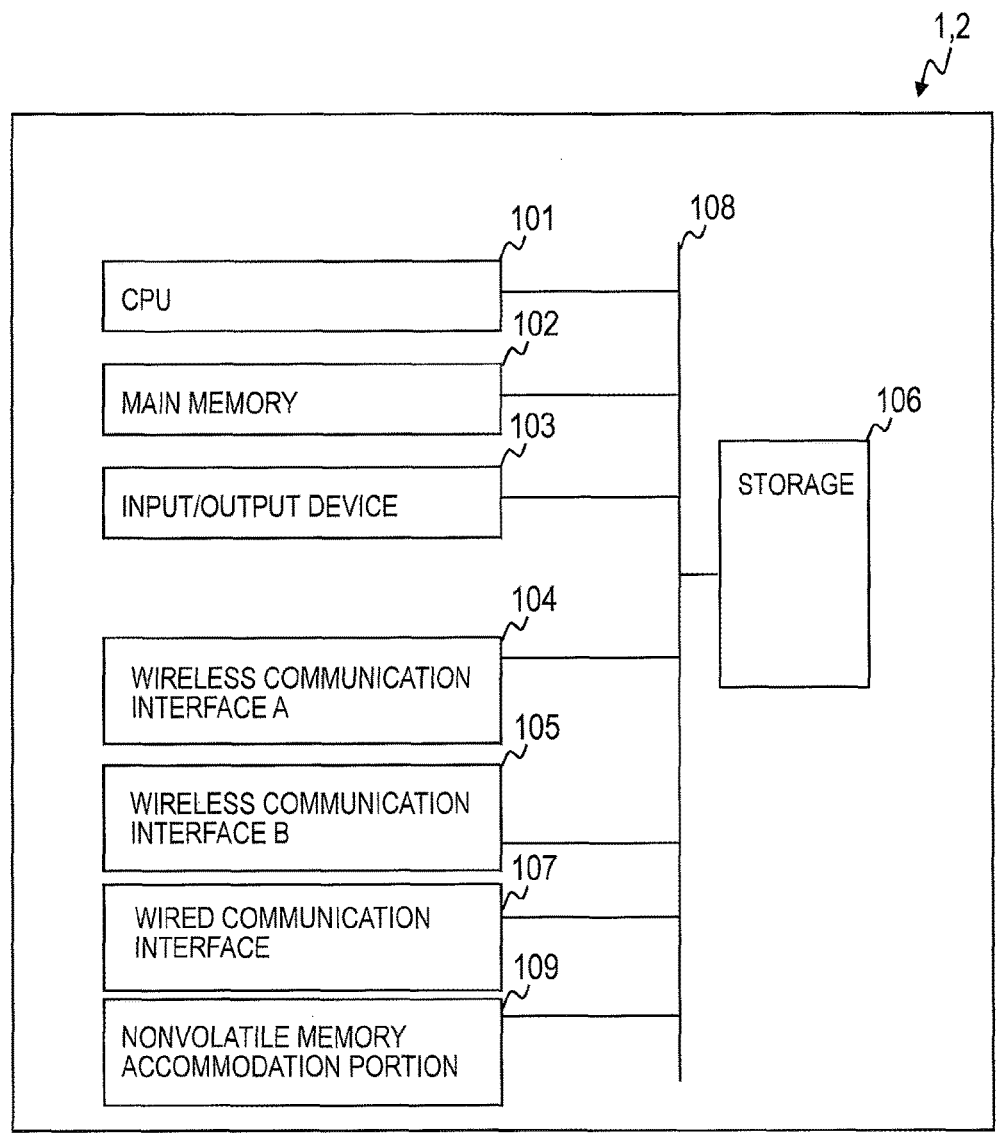
FIG. 2 is an explanatory diagram of a hardware configuration of a terminal according to the first embodiment of this invention.

FIG. 2 is an explanatory diagram of a hardware configuration of the terminal A 1 and the terminal B 2 according to the first embodiment of this invention.

The terminal A 1 and the terminal B 2 each include a CPU 101, a main memory 102, an input/output device (display, speakers, touch panel, or the like) 103, a wireless communication interface A 104, a wireless communication interface B 105, a storage 106, a wired communication interface 107, and a nonvolatile memory accommodation portion 109. The above-mentioned components are coupled to one another through a communication line 108 such as a bus.

The CPU 101 executes various kinds of processing by reading programs stored in the storage 106 into the main memory 102 and executing the programs. Further, the programs executed by the CPU 101 and data used by the CPU 101 may be stored in the storage 106 in advance, may be stored in a storage medium such as a CD-ROM, or may be downloaded from another apparatus via the communication line 31. Further, the functions implemented by the CPU 101 executing the programs may be implemented by dedicated hardware.

The programs executed by the CPU 101 and the data used by the CPU 101 are read into the main memory 102. The input/output device 103 includes input devices (for example, keyboard, mouse, and touch panel) for receiving an input from the user and output devices (for example, speakers and display) for outputting information to the user.

The wireless communication interface A 104 is an interface for coupling the terminal A 1 and the terminal B 2 to the communication line 31 in a wireless manner. The wireless communication interface B 105 is an interface for coupling the terminal A 1 and the terminal B 2 to an external apparatus existing at a short distance from the terminals A 1 and B 2.

The wired communication interface 107 is an interface for coupling the terminal A 1 and the terminal B 2 to an external apparatus in a wired manner. The nonvolatile memory accommodation portion 109 accommodates a portable nonvolatile memory.

The terminal A 1 and the terminal B 2 can be coupled to each other by the wireless communication interface B 105 such as Bluetooth or the wired communication interface 107 such as USB.

Further, the terminal A 1 and the terminal B 2 can transmit data to each other via the nonvolatile memory. Specifically, data stored on one terminal is stored into the nonvolatile memory accommodated in the nonvolatile memory accommodation portion 109, the nonvolatile memory is accommodated into the nonvolatile memory accommodation portion 109 of the other terminal, and the other terminal reads the data stored in the nonvolatile memory, to thereby transmit data between the terminal A 1 and the terminal B 2.

It should be noted that FIG. 2 illustrates an example in which the terminal A 1 and the terminal B 2 are coupled to the communication line 31 by the wireless communication interface A 104, but this invention is not limited thereto, and the terminal A 1 and the terminal B 2 may be coupled to the communication line 31 by the wired communication interface 107.

Figure 3:
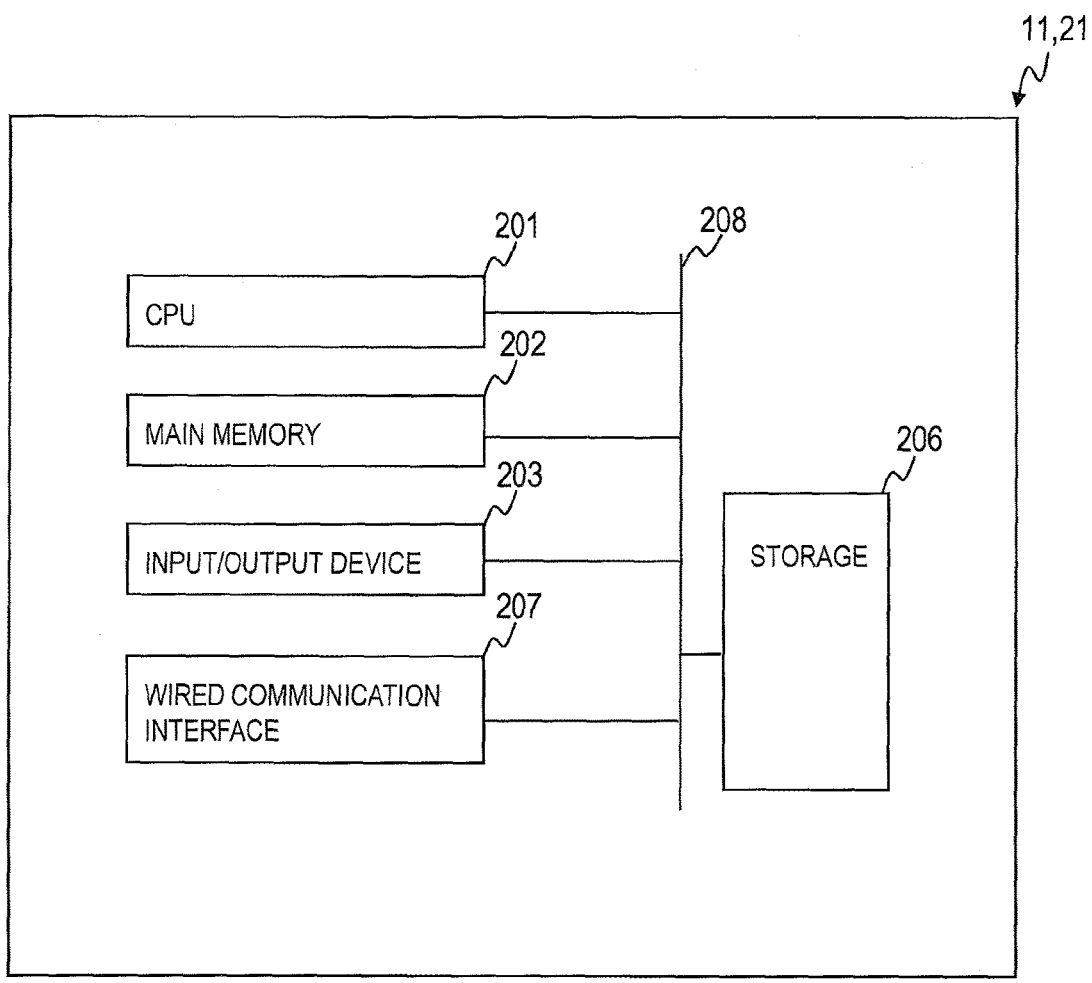
FIG. 3 is an explanatory diagram of a hardware configuration of a service server and an application server according to the first embodiment of this invention.

FIG. 3 is an explanatory diagram of a hardware configuration of the service server 11 and the application server 21 according to the first embodiment of this invention.

The service server 11 and the application server 21 each include a CPU 201, a main memory 202, an input/output device 203, a storage 206, and a wired communication interface 207. The above-mentioned components are coupled to one another through a communication line 208 such as a bus.

The CPU 201 is the same as the CPU 101 illustrated in FIG. 2, the main memory 202 is the same as the main memory 102 illustrated in FIG. 2, the input/output device 203 is the same as the input/output device 103 illustrated in FIG. 2, the storage 206 is the same as the storage 106 illustrated in FIG. 2, and the wired communication interface 207 is the same as the wired communication interface 107 illustrated in FIG. 2, and hence detailed descriptions thereof are omitted.

FIG. 4 is an explanatory diagram of the anonymous personal data stored in the anonymous personal data storage module 17 according to the first embodiment of this invention.

The anonymous personal data includes a virtual device ID 171, an application ID 172, and anonymous personal data 173.

Registered in the virtual device ID 171 is the virtual device ID assigned to the application management module 3 of the terminal A 1. Registered in the application ID 172 is the application ID assigned to the application 4 executed by the terminal A 1. Registered in the anonymous personal data 173 is the anonymous personal data.

The anonymous personal data is generated by the application 4 to be transmitted by the terminal A 1 in one case, and is generated by the service server 11 based on the request made by the application 4 in another case.

In the case where the anonymous personal data is transmitted by the terminal A 1, the terminal A 1 transmits the virtual device ID and the application ID to the service server 11 along with the anonymous personal data. Therefore, when receiving the anonymous personal data, the service server 11 adds a new entry to the anonymous personal data stored in the anonymous personal data storage module 17, registers the received virtual device ID in the virtual device ID 171 of the added entry, registers the received application ID in the application ID 172, and registers the received anonymous personal data in the anonymous personal data 173.

Further, in the case where the anonymous personal data is generated by the service server 11, the request made by the application 4 includes the virtual device ID and the application ID. When generating the anonymous personal data, the service server 11 adds a new entry to the anonymous personal data stored in the anonymous personal data storage module 17, registers the virtual device ID included in the request made by the application 4 in the virtual device ID 171 of the added entry, registers the application ID included in the request made by the application 4 in the application ID 172, and registers the generated anonymous personal data in the anonymous personal data 173.

In this manner, the anonymous personal data is stored in association with the virtual device ID and the application ID.

FIG. 5 is an explanatory diagram of the user registration management table 18 according to the first embodiment of this invention. The user registration management table 18 includes a user ID 181 and a virtual device ID 182.

Registered in the user ID 181 is the user ID of the user of the service provided by the service server 11. Registered in the virtual device ID 182 is the virtual device ID associated with the user.

When receiving the user registration data including the user ID and the virtual device ID which is transmitted by the terminal B 2, the user registration processing module 14 adds a new entry to the user registration management table 18, registers the user ID included in the received user registration data in the user ID 181 of the added entry, and registers the virtual device ID included in the received user registration data in the virtual device ID 182.

Figure 6:
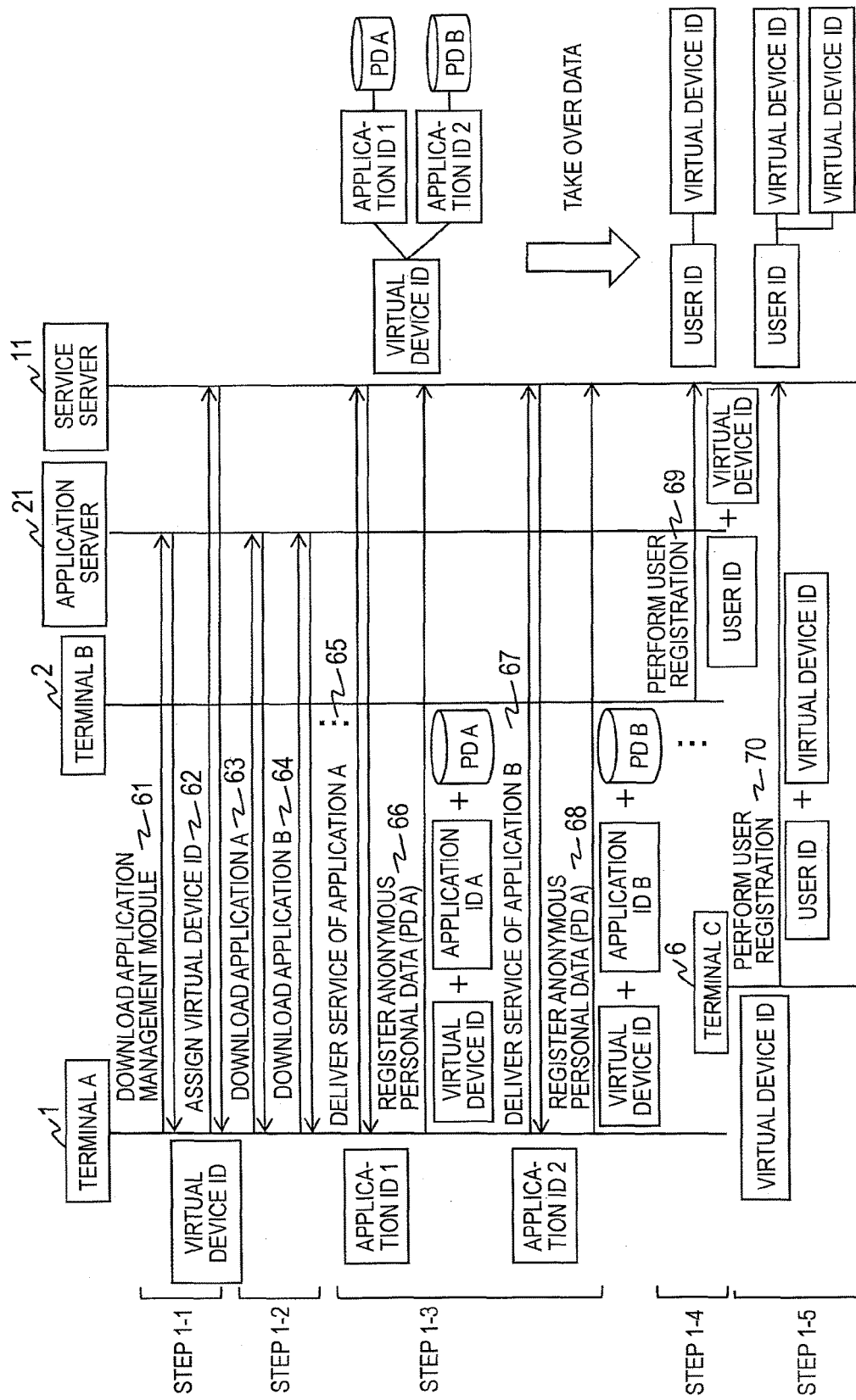
FIG. 6 is a sequence diagram of service providing processing according to the first embodiment of this invention.

FIG. 6 is a sequence diagram of service providing processing according to the first embodiment of this invention.

FIG. 6 illustrates a method of taking over the anonymous personal data in the case where, after the user uses a service on the terminal A 1 without user registration, the user carries out the user registration from the terminal B 2 and uses the service also on the terminal B 2.

(Step 1-1)

When receiving a predetermined operation from the user, the terminal A 1 transmits a download request for the application management module 3 to the application server 21. When receiving the download request for the application management module 3, the application server 21 transmits a program for implementing the application management module 3 to the terminal A 1. The terminal A 1 receives the program for implementing the application management module 3 transmitted by the application server 21, to thereby acquire the application management module 3 from the application server 21 (61).

It should be noted that, if the program for implementing the application management module 3 is stored on the terminal A 1 in advance, the terminal A 1 does not need to acquire the program from the application server 21.

Subsequently, when the application management module 3 is activated for the first time, the application management module 3 transmits an assignment request for the virtual device ID to the service server 11. When the service server 11 receives the assignment request for the virtual device ID, the virtual device ID distribution processing module 12 generates a unique virtual device ID, and transmits the generated virtual device ID to the terminal A 1. The terminal A 1 receives the virtual device ID, and assigns the received virtual device ID to the application management module 3 (62). The virtual device ID allows the service server 11 to identify the application management module 3.

It should be noted that, when the application management module 3 is activated for the first time, the application management module 3 may generate its own virtual device ID and assign the generated virtual device ID to itself.

Further, examples of the terminal A 1 include a smartphone, an advanced mobile phone, and an in-vehicle terminal.

(Step 1-2) When receiving a predetermined operation from the user, the terminal A 1 transmits a download request for the application 4 for using the service provided by the service server 11 to the application server 21. When receiving the download request for the application 4, the application server 21 transmits the application 4 to the terminal A 1. The terminal A 1 receives the application 4 transmitted by the application server 21, to thereby acquire the application 4. In FIG. 6, the terminal A 1 acquires the application 4A (63), and acquires the application 4B (64).

It should be noted that, if the application 4 is stored on the terminal A 1 in advance, the terminal A 1 does not need to acquire the application 4 from the application server 21.

(Step 1-3)

The user activates the application 4, and inputs a predetermined operation to the application 4, to thereby start to use the service provided by the service server 11 (65 and 67).

When the application 4 is activated for the first time, the application 4 transmits an acquisition request for the application ID to the service server 11. When receiving the acquisition request for the application ID, the service server 11 generates an application ID, and transmits the generated application ID to the terminal A 1. When receiving the application ID transmitted by the service server 11, the terminal A 1 assigns the received application ID to the application 4.

It should be noted that, when the application 4 is activated for the first time, the application 4 may generate its own application ID and assign the generated application ID to itself.

When the application 4 is executed to generate the anonymous personal data, the terminal A 1 transmits the anonymous personal data, the virtual device ID assigned to the application management module 3, and the application ID of the application 4 that has generated the anonymous personal data to the service server 11 (66 and 68). When receiving the virtual device ID, the application ID, and the anonymous personal data that have been transmitted by the terminal A 1, the service server 11 adds a new entry to the anonymous personal data stored in the anonymous personal data storage module 17, registers the received virtual device ID in the virtual device ID 171 of the added entry, registers the received application ID in the application ID 172, and registers the received anonymous personal data in the anonymous personal data 173. Accordingly, the anonymous personal data is stored in association with the virtual device ID and the application ID.

(Step 1-4)

Subsequently, the user executes the user registration for the service server 11 from the terminal B 2. The user inputs the user registration data including the user ID, the password, and the virtual device ID to the browser 5 of the terminal B 2. It should be noted that, when receiving a predetermined operation from the user, the terminal A 1 presents the user with the virtual device ID assigned to its own application management module 3. The user inputs the virtual device ID to the browser 5 of the terminal B 2 while confirming the virtual device ID presented by the terminal A 1.

The terminal B 2 transmits the user registration data input to the browser 5 to the service server 11 (69). When receiving the user registration data transmitted by the terminal B 2, the service server 11 registers the user ID and the virtual device ID that are included in the received user registration data in the user registration management table 18 in association with each other.

If the anonymous personal data is to be used from the terminal B 2 after the user registration, the terminal B 2 transmits a use request for the anonymous personal data to the service server 11. The use request includes the user ID. When receiving the use request for the anonymous personal data transmitted by the terminal B 2, the service server 11 refers to the user registration management table 18 to acquire the virtual device ID associated with the user ID included in the received use request for the anonymous personal data. Then, the service server 11 allows use of the anonymous personal data registered in the entry in which the acquired virtual device ID is registered in the virtual device ID 171 among the anonymous personal data stored in the anonymous personal data storage module 17.

Accordingly, the anonymous personal data generated by the terminal A 1 without user registration is associated with the user ID, and the anonymous personal data can be used also from the terminal B 2 after the user registration. In other words, the anonymous personal data can be taken over after the user registration.

Next, a description is made of a case where the anonymous personal data is used from the terminal A 1 after the user registration.

The terminal A 1 transmits the use request for the anonymous personal data to the service server 11. The use request includes the user ID. The use request including the user ID does not need to include the virtual device ID.

Processing of the service server 11 performed in this case is the same as the processing performed when the service server 11 receives the use request for the anonymous personal data including the user ID from the above-mentioned terminal B 2, and hence a description thereof is omitted. Further, the use request for the anonymous personal data transmitted by the terminal A 1 may include the virtual device ID without including the user ID. In this case, when receiving the use request for the anonymous personal data, the service server 11 allows the use of the anonymous personal data registered in the entry in which the virtual device ID included in the use request is registered in the virtual device ID 171 among the anonymous personal data stored in the anonymous personal data storage module 17.

With the above-mentioned configuration, the anonymous personal data before the user registration can continue to be used from the terminal A 1 also after the user registration.

(Step 1-5)

Next, a description is made of processing performed in a case where the user carries out the user registration from a terminal C 6 different from the terminal A 1 after the user carries out the user registration from the terminal B 2.

The terminal C 6 is a smartphone or the like of the same kind as the terminal A 1, and it is assumed that the application management module 3 and the application 4 are downloaded onto the terminal C 6 with the virtual device ID assigned to the application management module 3 and the application ID assigned to the application 4.

The user carries out the user registration or user login from the terminal C 6 (second terminal). In this case, the user inputs the user ID and the password, which are the same as the user ID and the password that have been input to the terminal B 2, to the terminal C 6. When the user ID and the password are input to the terminal C 6, the terminal C 6 acquires the virtual device ID from the application management module 3, and transmits the user registration data including the user ID and the password that have been input and the acquired virtual device ID to the service server 11 (70).

When receiving the user registration data from the terminal C 6, the service server 11 refers to the user registration management table 18 to determine whether or not the number of virtual device IDs associated with the user ID included in the received user registration data is larger than a predetermined value.

When determining that the number of virtual device IDs associated with the user ID is larger than the predetermined value, the service server 11 transmits, to the terminal C 6, a message indicating a state (state 1) in which the user ID and the virtual device ID cannot be associated with each other. When receiving the message indicating the state 1 transmitted from the service server 11, the terminal C 6 displays a screen indicating that the anonymous personal data associated with the virtual device ID of another terminal (terminal A 1) cannot be taken over.

On the other hand, when determining that the number of virtual device IDs associated with the user ID is equal to or smaller than the predetermined value, the service server 11 transmits, to the terminal C 6, a message indicating a state (state 2) in which the user ID and the virtual device ID can be associated with each other.

When receiving the message indicating the state 2 transmitted from the service server 11, the terminal C 6 displays a screen for obtaining, from the user, acknowledgment that the anonymous personal data associated with the virtual device ID of another terminal (terminal A 1) is to be consolidated into the user ID input to the terminal C 6 by the user. When receiving an operation for the acknowledgment from the user, the terminal C 6 transmits a message indicating the acknowledgment to the service server 11.

When receiving the message indicating the acknowledgment from the terminal C 6, the service server 11 stores the user ID and the virtual device ID that are included in the user registration data in the user registration management table 18 in association with each other. It should be noted that the service server 11 discards the received user registration data if the message indicating the acknowledgment has not been received from the terminal C 6 within a predetermined time period since the message indicating the state 2 was transmitted.

With the above-mentioned configuration, even when the user carries out user registration from the terminal C 6 different from the terminal A 1 after the user registration, the anonymous personal data associated with the virtual device ID of the terminal A 1 can be taken over to the terminal C 6.

Next, other methods for the user registration are described.

First, the first method is described.

When the user attempts to input the user registration data to the browser 5 of the terminal B 2, the terminal B 2 presents the user with the fact that the anonymous personal data can continue to be used also after the user registration if the user registration is carried out from the terminal A 1, to thereby guide the user to carrying out the user registration from the terminal A 1.

When the user carries out the user registration from the terminal A 1, the user does not need to input the virtual device ID. Specifically, when the user ID and the password are input, the terminal A 1 acquires the virtual device ID from the application management module 3, and transmits the user ID and the password that have been input and the acquired virtual device ID to the service server 11 as the user registration data.

In this case, the user does not need to input the virtual device ID, which simplifies the user registration.

Next, the second method is described.

When the user registration is carried out from the terminal B2, the terminal A 1 writes the virtual device ID assigned to the application management module 3 of the terminal A 1 to the nonvolatile memory accommodated in the nonvolatile memory accommodation portion 109. Then, the user takes out the nonvolatile memory accommodated in the nonvolatile memory accommodation portion 109 of the terminal A 1, and accommodates the nonvolatile memory into a nonvolatile memory accommodation portion (not shown) provided to the terminal B 2. The terminal B 2 reads the virtual device ID stored in the nonvolatile memory accommodated in the nonvolatile memory accommodation portion, and hands over the read virtual device ID to the browser 5. Then, the terminal B 2 transmits the user registration data including the user ID and the password that have been input from the user and the virtual device ID handed over to the browser 5, to the service server 11.

It should be noted that in the second method, the virtual device ID is handed over from the terminal A 1 to the terminal B 2 via the nonvolatile memory, but the virtual device ID may be handed over from the terminal A 1 to the terminal B 2 via wired communications or wireless communications.

Thus, the user does not need to input the virtual device ID, which simplifies the user registration.

Next, the third method is described.

First, when receiving a predetermined operation from the user, the terminal A 1 or the terminal B 2 transmits an issuance request for an ID with an expiration date, which is guaranteed to be unique only during a predetermined time period, to the service server 11. The issuance request includes the virtual device ID. When the issuance request for the ID with the expiration date is transmitted from the terminal B 2, it is desired that the terminal B 2 acquire a request for the virtual device ID by using the second method.

When receiving the issuance request for the ID with the expiration date, the service server 11 generates the ID with the expiration date, and stores the generated ID with the expiration date and the virtual device ID included in the received issuance request for the ID with the expiration date in association with each other. Further, the service server 11 transmits the generated ID with the expiration date to the terminal B 2.

It should be noted that the service server 11 generates the ID with the expiration date so that the ID with the expiration date has a smaller number of digits than that of the virtual device ID. For example, the service server 11 generates, as the ID with the expiration date, a hash value obtained by using the virtual device ID included in the received issuance request for the ID with the expiration date as an input element.

When receiving the ID with the expiration date, the terminal A 1 or the terminal B 2 that has transmitted the issuance request for the ID with the expiration date displays the received ID with the expiration date.

While confirming the ID with the expiration date displayed on the terminal A 1 or the terminal B 2, the user inputs the user ID, the password, and the ID with the expiration date to the browser 5 of the terminal B 2 as the user registration data. The terminal B 2 transmits the input user registration data to the service server 11.

When receiving the user registration data, the service server 11 selects the virtual device ID associated with the ID with the expiration date included in the received user registration data. Then, the service server 11 associates the selected virtual device ID with the user ID included in the received user registration data, and stores this association in the user registration management table 18.

In the third method, the user only needs to input the ID with the expiration date having a smaller number of digits than that of the virtual device ID to the terminal B 2 instead of the virtual device ID, which simplifies the user registration compared to the user registration that requires the virtual device ID to be input.

Figure 7:
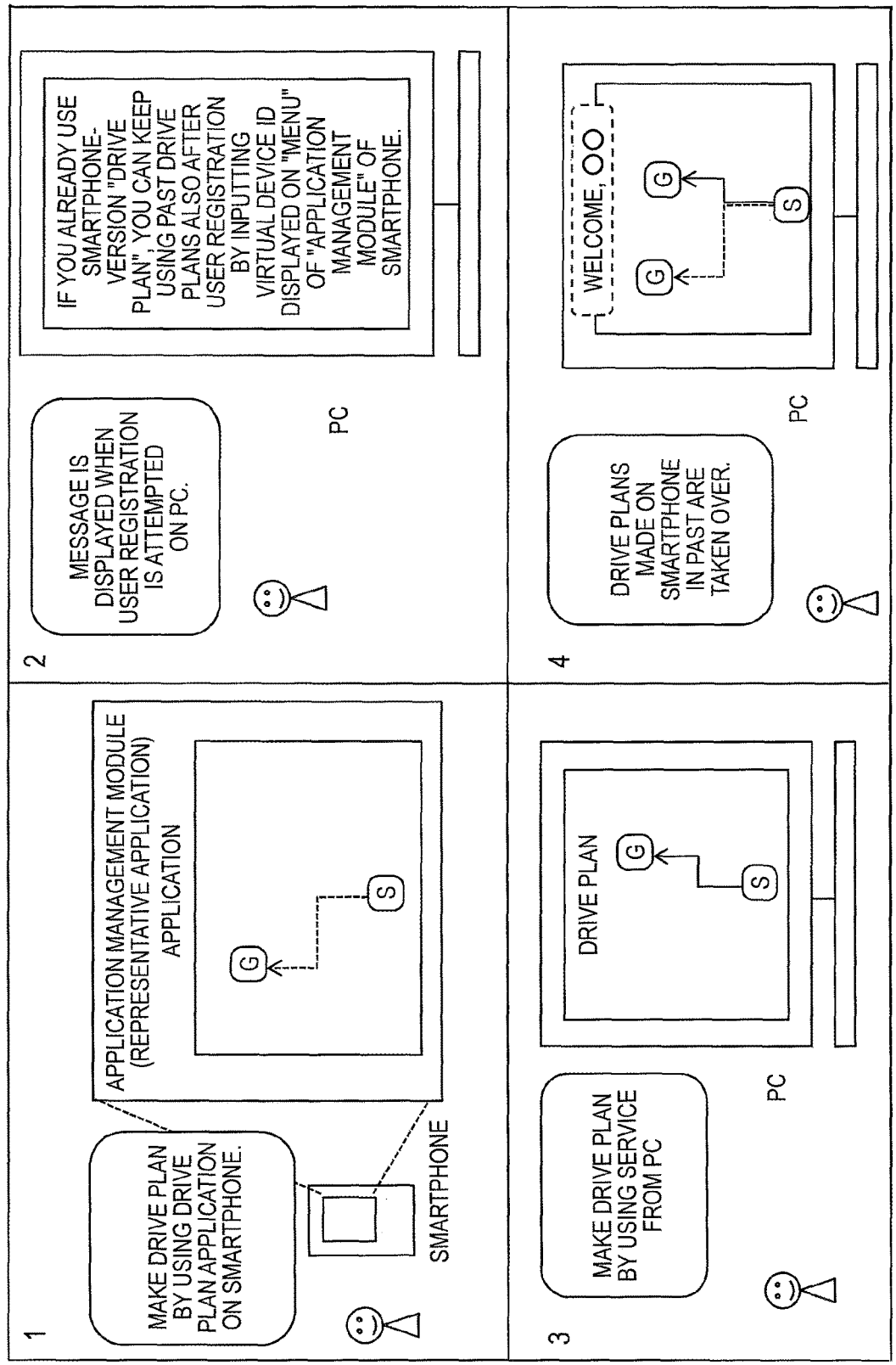
FIG. 7 is an explanatory diagram of a usage scene according to the first embodiment of this invention.

FIG. 7 is an explanatory diagram of a usage scene according to the first embodiment of this invention.

1. The user downloads the program for implementing the application management module 3 and the application 4 called "drive plan" onto the terminal A 1 (for example, smartphone), and executes the application 4, to make a drive plan.

2. Subsequently, the user attempts to carry out the user registration from the terminal B 2 (for example, PC). In this case, the terminal B 2 displays the message indicating that a past drive plan can continue to be used also after the user registration by inputting the virtual device ID of the terminal A 1.

When the user inputs the user ID, the password, and the virtual device ID to the terminal B 2 after viewing the message displayed on the terminal B 2, the terminal B 2 transmits the user registration data including the user ID, the password, and the virtual device ID to the service server 11. When receiving the user registration data, the service server 11 stores the user ID and the virtual device ID that are included in the received user registration data in the user registration management table 18 in association with each other.

3. After the user registration, the user uses the service of the service server 11 from the terminal B 2, to make a drive plan.

4. By transmitting the use request for the anonymous personal data from the terminal B 2 to the service server 11 after the user registration, the terminal B 2 can acquire the anonymous personal data made in the past through use of the terminal A 1 from the service server 11 and display the acquired anonymous personal data.

With the above-mentioned configuration, according to this embodiment, in a case where the user carries out the user registration from the terminal B 2, the anonymous personal data generated from the terminal A 1 without user registration can be taken over also after the user registration.

(Second Embodiment)

A second embodiment of this invention is described with reference to FIG. 8 and FIG. 9. It should be noted that in this embodiment, the same components and processing steps as those of the first embodiment are denoted by the same reference numerals, and descriptions thereof are omitted.

In this embodiment, in a case where the terminal A 1 executes a plurality of applications 4 and the user carries out the user registration from the terminal A 1, the anonymous personal data generated by the plurality of applications 4 and stored on the service server 11 is consolidated.

A service provision system according to the second embodiment includes the terminal A 1 including the plurality of applications 4 and the application management module 3 and the service server 11 as essential components, and does not need to include the terminal B 2 illustrated in FIG. 1.

Figure 8:
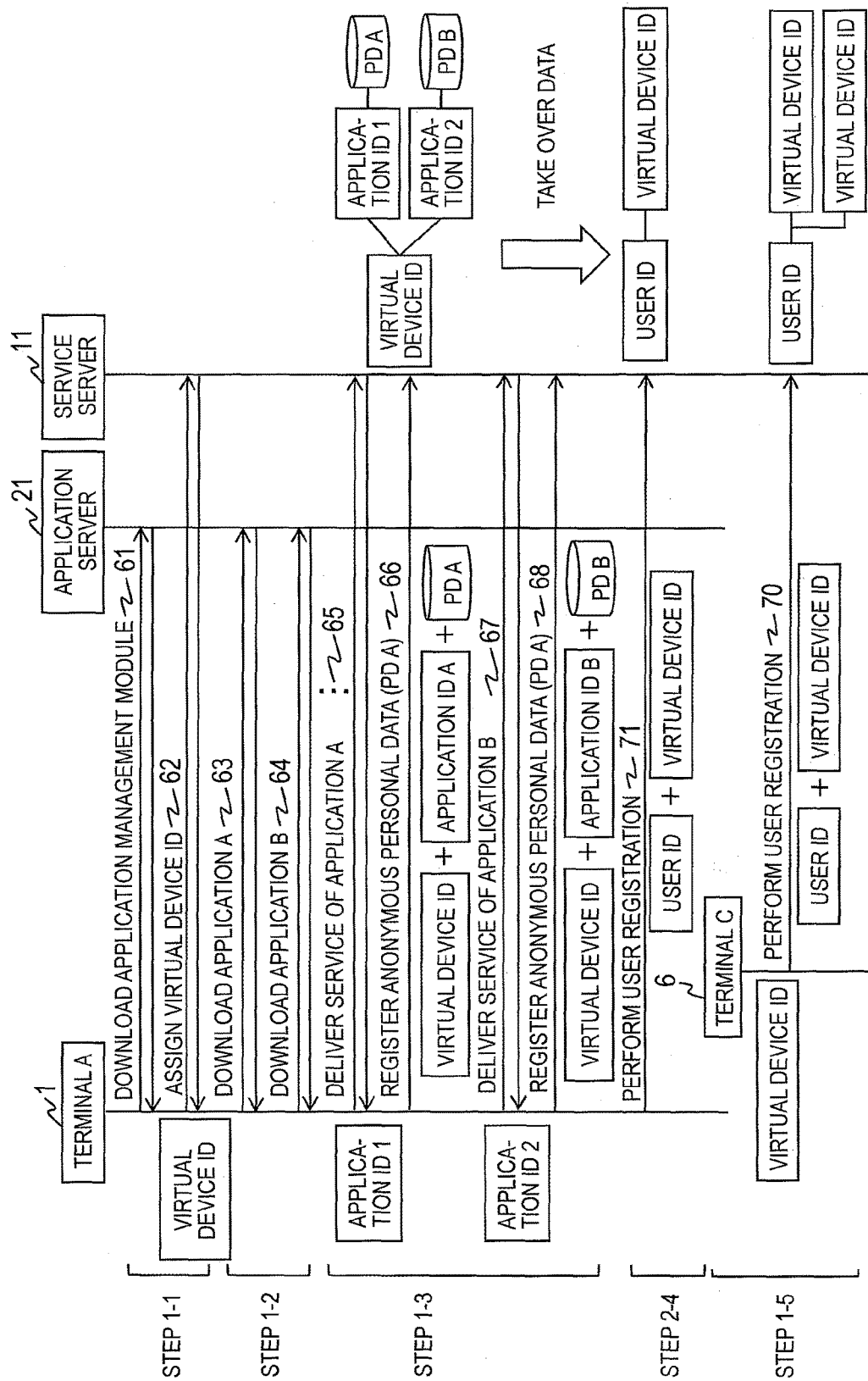
FIG. 8 is a sequence diagram of service providing processing according to a second embodiment of this invention.

FIG. 8 is a sequence diagram of service providing processing according to the second embodiment of this invention. In the service providing processing according to the second embodiment, the same processing steps as those of the service providing processing according to the first embodiment illustrated in FIG. 6 are denoted by the same reference numerals, and descriptions thereof are omitted. Specifically, in the service providing processing according to the second embodiment, the processing steps (Step 1-1 to Step 1-3 (61 to 68)) up to the carrying out of the user registration and the processing step (Step 1-5 (70)) of carrying out the user registration from another terminal C 6 after the user registration are the same processing steps as those of the service providing processing according to the first embodiment.

(Step 2-4)

In this embodiment, unlike in the first embodiment, the user carries out the user registration from the terminal A 1. In this case, the user inputs the user ID and the password to the terminal A 1. In other words, the terminal A 1 functions as the user registration module for receiving the input of the information regarding the user registration. When the user ID and the password are input, the terminal A 1 acquires the virtual device ID from the application management module 3, and transmits the user registration data including the user ID and the password that have been input and the acquired virtual device ID to the service server 11 (71).

When receiving the user registration data transmitted by the terminal A 1, the service server 11 registers the user ID and the virtual device ID that are included in the received user registration data in the user registration management table 18 in association with each other.

Accordingly, to use the anonymous personal data from the terminal A 1 after the user registration, the terminal A 1 can use the anonymous personal data merely by transmitting the use request for the anonymous personal data by including the user ID therein without needing to transmit the use request for the anonymous personal data by including the virtual device ID therein. Further, the user ID is associated with the virtual device ID, and hence the anonymous personal data generated by the application 4 of the terminal A 1 can be used also from another terminal C 6 as in Step 1-5.

Figure 9:
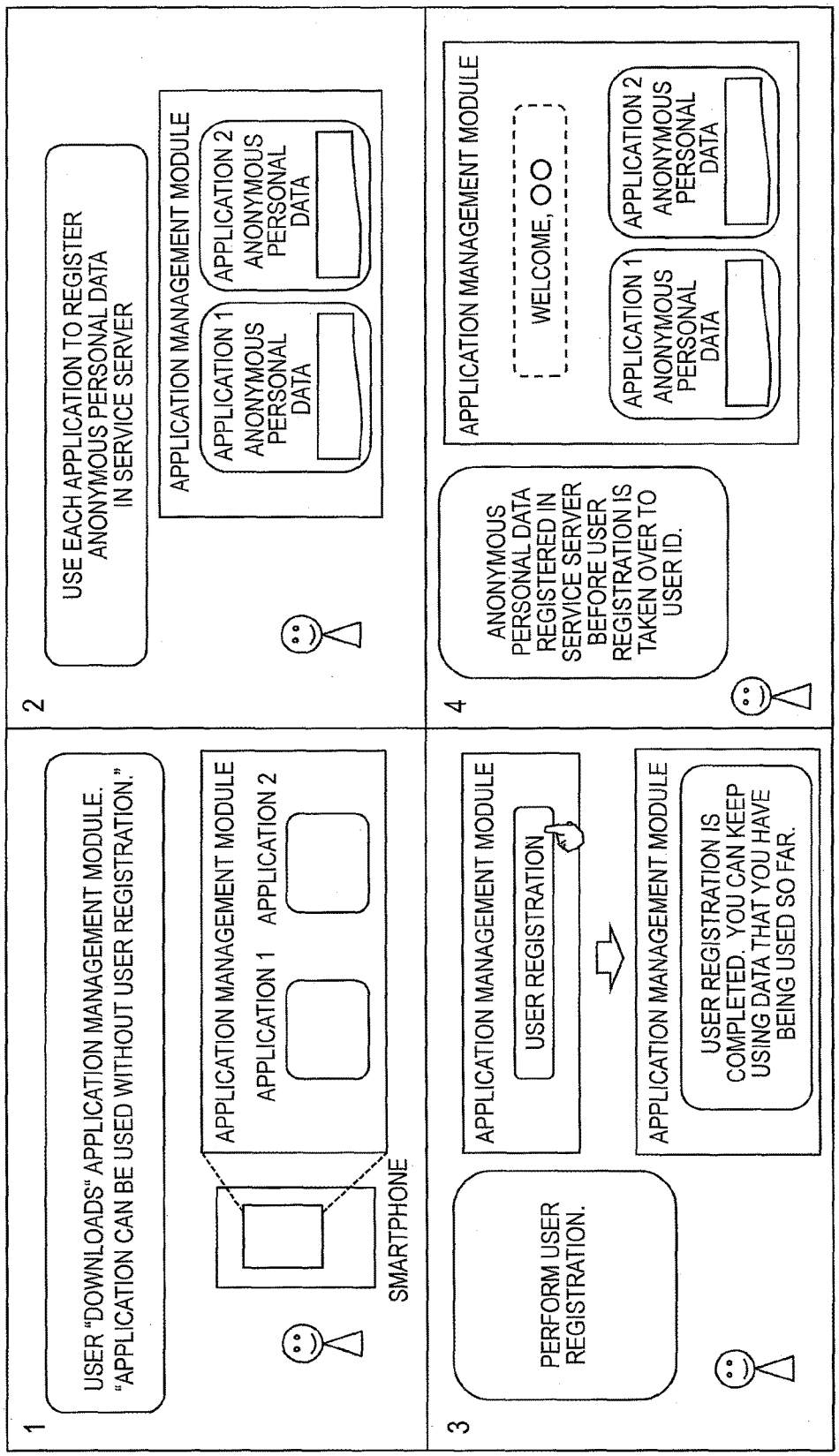
FIG. 9 is an explanatory diagram of a usage scene according to the second embodiment of this invention.

FIG. 9 is an explanatory diagram of a usage scene according to the second embodiment of this invention.

1. The user downloads the application management module 3 and the plurality of applications 4 onto the terminal A 1 (for example, smartphone). The downloaded plurality of applications 4 can be used without user registration.

2. The terminal A 1 transmits the anonymous personal data generated by each of the applications 4 to the service server 11 along with the virtual device ID assigned to the application management module 3 and the application ID assigned to each of the applications 4, and stores the anonymous personal data on the service server 11.

3. The user inputs the user ID and the password to the terminal A 1, and carries out the user registration. The terminal A 1 transmits the user registration data including the user ID, the password, and the virtual device ID to the service server 11, and the service server 11 associates the user ID with the virtual device ID, to thereby complete the user registration. In this case, the fact that the user registration has been completed and the fact that the anonymous personal data generated before the user registration can continue to be used are displayed on the terminal A 1.

4. The service server 11 associates the user ID with the virtual device ID, to thereby consolidate the anonymous personal data into the user ID.

With the above-mentioned configuration, in a case where the terminal A 1 executes the plurality of applications 4 and the user carries out the user registration from the terminal A 1, the anonymous personal data generated by the plurality of applications 4 and stored on the service server 11 is consolidated into the user ID.

(Modification Example of Second Embodiment)

A modification example of the second embodiment of this invention is described with reference to FIGS. 10 to 13. It should be noted that in this modification example, the same components and processing steps as those of the first and second embodiments are denoted by the same reference numerals, and descriptions thereof are omitted.

In the second embodiment, the terminal A 1 transmits the user registration data including the user ID and the virtual device ID to the service server 11, while in this modification example, the terminal A 1 transmits, to the service server 11, not only the user ID and the virtual device ID but also the user registration data including application-identifiable information for placing a limit to the anonymous personal data to be consolidated into the user ID.

Accordingly, only the anonymous personal data generated by the application 4 identified by the application-identifiable information can be consolidated into the user ID.

FIG. 10 is an explanatory diagram of the user registration management table 18 according to the modification example of the second embodiment of this invention.

The user registration management table 18 includes the user ID 181, the virtual device ID 182, and an application ID 183. The user ID 181 and the virtual device ID 182 are the same as those of FIG. 5, and hence descriptions thereof are omitted.

Registered in the application ID 183 is the application ID associated with the user ID registered in the user ID 181 and the virtual device ID registered in the virtual device ID 182.

Figure 11:
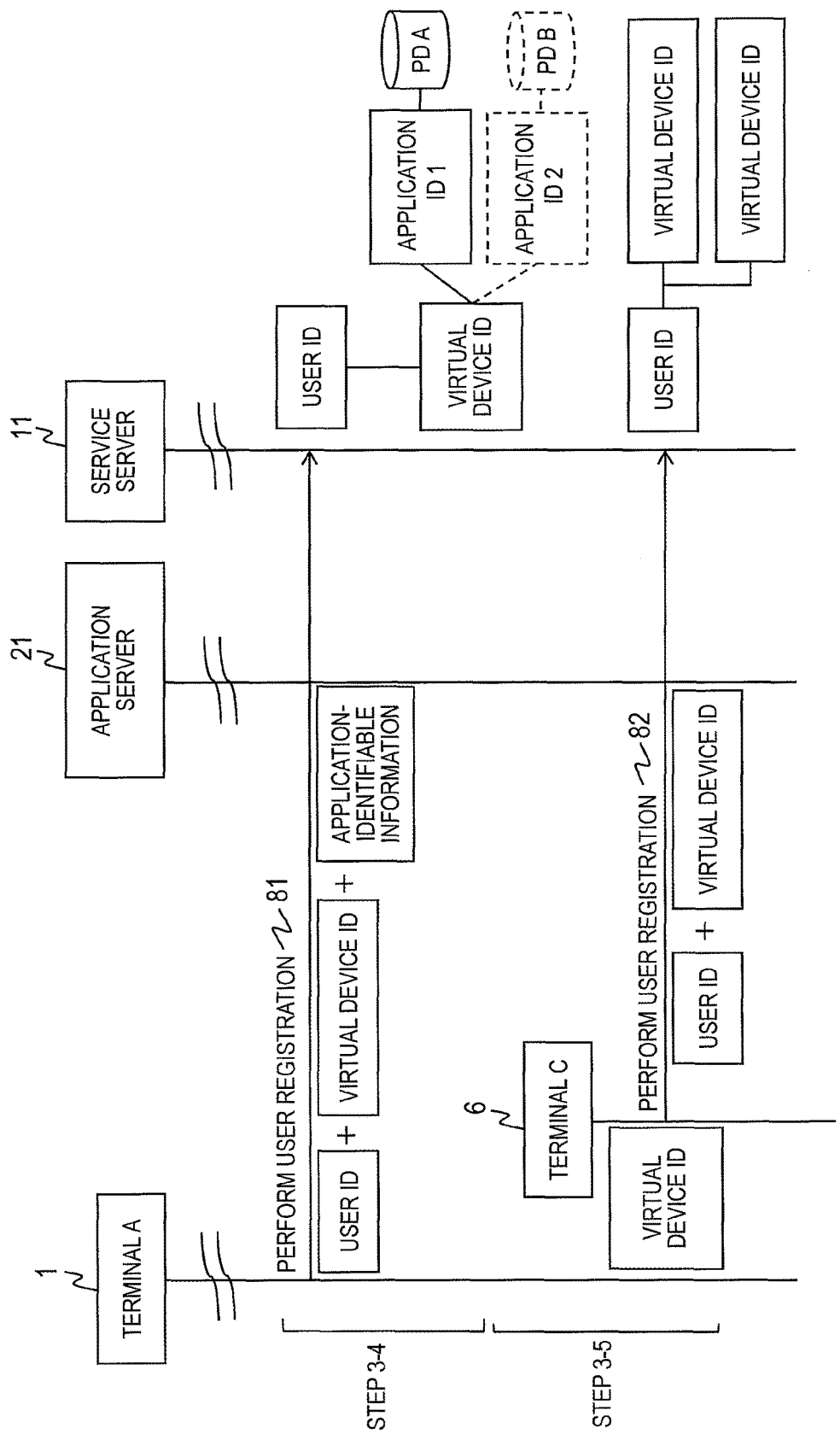
FIG. 11 is a sequence diagram of service providing processing according to the modification example of the second embodiment of this invention.

FIG. 11 is a sequence diagram of service providing processing according to the modification example of the second embodiment of this invention.

FIG. 11 illustrates user registration processing (Step 3-4) performed from the terminal A 1 after Step 1-1 to Step 1-3 have been executed and user registration processing (Step 3-5) performed from another terminal C 6.

(Step 3-4)

When the user carries out the user registration from the terminal A 1, the user inputs not only the user ID and the password but also the application ID wished to be associated with the virtual device ID to the terminal A 1 as the application-identifiable information.

When the user ID, the password, and the application-identifiable information are input, the terminal A 1 acquires the virtual device ID from the application management module 3, and transmits, to the service server 11, the user registration data including the user ID, the password, and the application-identifiable information that have been input and the acquired virtual device ID (81). Here, it is assumed that an application ID 1 assigned to the application 4A is input as the application-identifiable information.

When receiving the user registration data transmitted by the terminal A 1, the service server 11 associates the user ID, the virtual device ID, and the application ID that are included in the user registration data with each other, and registers this association in the user registration management table 18.

Specifically, the service server 11 adds a new entry to the user registration management table 18. Then, the service server 11 registers the user ID included in the received user registration data in the user ID 181 of the added entry, registers the virtual device ID included in the received user registration data in the virtual device ID 182 of the added entry, and registers the application ID included as the application-identifiable information in the application ID 183 of the added entry. In FIG. 11, the anonymous personal data on the application 4A of the application ID 1 and the anonymous personal data on the application 4B of an application ID 2 are stored, but only the anonymous personal data on the application ID 1 is associated with the user ID.

When receiving the use request for the anonymous personal data including the user ID or the virtual device ID from the terminal A 1 after the user registration, the service server 11 allows the anonymous personal data corresponding to the received use request to be used.

Specifically, the service server 11 refers to the user registration management table 18 to acquire the entry in which the user ID 181 or the virtual device ID 182 matches the user ID or the virtual device ID included in the received use request. Then, the service server 11 refers to the anonymous personal data stored in the anonymous personal data storage module 17 to allow the terminal A 1 to use the anonymous personal data registered in the entry in which the virtual device ID 171 and the application ID 172 that match the virtual device ID registered in the virtual device ID 182 of the acquired entry and the application ID registered in the application ID 183 thereof.

With the above-mentioned configuration, the user can designate, at the time of the user registration, the application 4 that has generated the anonymous personal data to be consolidated into the user ID.

(Step 3-5)

A description is made of a case where the user carries out the user registration from the terminal C 6 after the user registration.

The user inputs the user ID and the password to the terminal C 6. When the user ID and the password are input, the terminal C 6 acquires the virtual device ID from the application management module 3, and transmits the user registration data including the user ID and the password that have been input and the acquired virtual device ID to the service server 11 (82).

When receiving the user registration data, in the same manner as in the first embodiment and the second embodiment, the service server 11 refers to the user registration management table 18 to determine whether or not the number of virtual device IDs associated with the user ID included in the received user registration data is larger than a predetermined value.

When determining that the number of virtual device IDs associated with the user ID is equal to or smaller than the predetermined number, the service server 11 associates the user ID and the virtual device ID that are included in the received user registration data with the application ID that has already been associated with the user ID, and registers this association in the user registration management table 18.

Specifically, the service server 11 adds a new entry to the user registration management table 18, and acquires the application ID registered in the application ID 183 of the entry in which the user ID 181 of the user registration management table 18 matches the user ID included in the user registration data. Then, the service server 11 registers the user ID included in the user registration data in the user ID 181 of the added entry, registers the virtual device ID included in the user registration data in the virtual device ID 182 of the added entry, and registers the acquired application ID in the application ID 183 of the added entry.

Accordingly, the anonymous personal data that can be used by the terminal A 1 after the user registration is allowed to be used by the terminal C 6 after the user registration from the terminal C 6.

It should be noted that, when the user carries out the user registration from the terminal C 6, the user may input not only the user ID and the password but also the application ID of the terminal A 1 with which the virtual device ID of the terminal C 6 is wished to be associated as the application-identifiable information. This case is described in detail.

First, the terminal C 6 transmits the user registration data including the user ID, the password, the virtual device ID, and the application-identifiable information to the service server 11.

When receiving the user registration data, the service server 11 associates the user ID, the virtual device ID, and the application ID, which are included in the received user registration data with each other, and registers this association in the user registration management table 18.

Specifically, the service server 11 adds a new entry to the user registration management table 18, registers the user ID included in the user registration data in the user ID 181 of the added entry, registers the virtual device ID included in the user registration data in the virtual device ID 182 of the added entry, and registers the application ID serving as the application-identifiable information included in the user registration data in the application ID 183 of the added entry.

Accordingly, the user can designate the application of the anonymous personal data that can be used after the user registration from the terminal C 6.

The above-mentioned modification example is described by taking the example in which the user inputs, at the time of the user registration, the application ID serving as unique identification information on the application downloaded onto the terminal A 1 to the terminal A 1 as the application-identifiable information. The application ID is the identification information assigned to each individual application 4, and even the applications 4 that provide the same service have different application IDs among respective terminals onto which the applications 4 are downloaded. Therefore, in order to input the application ID at the time of the user registration, the user needs to operate the terminal A 1 to confirm the application ID assigned to the application 4 downloaded onto the terminal A 1. Therefore, the user may input, as the application-identifiable information, a service ID serving as identification information on a service provided by the application 4. Now, a detailed description is made of a case where the user inputs the service ID to the terminal A 1 as the application-identifiable information.

In this case, the service server 11 includes a service management table 19 for identifying the application ID from the service ID.

FIG. 12 is an explanatory diagram of the service management table 19 according to the modification example of the second embodiment of this invention.

The service management table 19 includes a service ID 191, a virtual device ID 192, and an application ID 193.

Registered in the service ID 191 is the service ID. Registered in the virtual device ID 192 is the virtual device ID of the terminal A 1 onto which the application 4 that provides the service identified by the service ID registered in the service ID 191 is downloaded. Registered in the application ID 193 is the application ID of the application 4 that provides the service identified by the service ID registered in the service ID 191.

A description is made of registration processing for the service management table 19.

To generate the application ID in Step 1-3, the service server 11 identifies the service provided by the application 4 whose application ID is to be generated, and stores the service ID of the identified service and the generated application ID in the service management table 19 shown in FIG. 12 in association with each other.

Specifically, the terminal A 1 transmits an acquisition request for the application ID by including therein the service ID provided by the application 4 to which the application ID is to be assigned and the virtual device ID. It should be noted that it is assumed that the service ID has been assigned to the application 4 at a time of downloading the application 4.

When receiving the acquisition request for the application ID transmitted by the terminal A 1, the service server 11 generates the application ID, and resisters the service ID and the virtual device ID that are included in the acquisition request for the application ID and the generated application ID in the service management table 19.

Specifically, the service server 11 searches for an entry in which the service ID included in the received acquisition request for the application ID is registered in the service ID 191, and when there is a matched entry, registers the virtual device ID included in the received acquisition request for the application ID in the virtual device ID 192 of the entry and the generated application ID in the application ID 193 of the entry.

On the other hand, when there is no matched entry, the service server 11 adds a new entry to the service management table 19, registers the service ID included in the received acquisition request for the application ID in the service ID 191 of the added entry, registers the virtual device ID included in the received acquisition request for the application ID in the virtual device ID 192 of the added entry, and registers the generated application ID in the application ID 193 of the added entry.

Next, user registration processing performed when the user inputs the service ID to the terminal A 1 as the application-identifiable information is described with reference to FIG. 11.

The user inputs the user ID, the password, and the service ID to the terminal A 1. When the user ID, the password, and the service ID are input, the terminal A 1 transmits the user registration data including the user ID, the password, the virtual device ID, and the service ID to the service server 11 (81).

When receiving the user registration data including the user ID, the password, the virtual device ID, and the service ID serving as the application-identifiable information, the service server 11 refers to the service management table 19 to identify the application ID corresponding to the service ID and the virtual device ID included in the user registration data.

Next, the service server 11 registers the user ID and the virtual device ID that are included in the received user registration data and the identified application ID in the user registration management table 18.

Accordingly, only by inputting the service ID without inputting the application ID, the user can designate the application 4 that has generated the anonymous personal data that can be used.

Next, a description is made of a case where the terminal A 1 transmits the user registration data including a rank as the application-identifiable information to the service server 11.

The rank is set in the terminal A 1 used by the user, and the service of the anonymous personal data for which the consolidation into the user ID is permitted is set for each rank in advance.

The service server 11 includes not only the above-mentioned service management table 19 but also a rank management table 30 for managing the rank and the service ID of the service for which the rank permits the consolidation.

FIG. 13 is an explanatory diagram of the rank management table 30 according to the modification example of the second embodiment of this invention.

The rank management table 30 includes a rank 301 and a service ID 302. Registered in the rank 301 is a rank ID serving as the identification information on the rank. Registered in the service ID 302 is the service ID of the service for which the rank identified by the rank ID registered in the rank 301 permits the consolidation into the user ID.

In FIG. 13, a rank A permits the anonymous personal data generated by the application 4 for providing two services (services A and B) to be consolidated into the user ID, while a rank B permits the anonymous personal data generated by the application 4 for providing three services (services A, B, and C) to be consolidated into the user ID. For example, a charge for a subscription to the rank B may be set higher than a charge for a subscription to the rank A.

Next, user registration processing performed when the terminal A 1 transmits the user registration data including the rank as the application-identifiable information is described with reference to FIG. 11.

First, when the user ID and the password are input, the terminal A 1 transmits the user registration data including the user ID, the password, the virtual device ID, and the rank ID to the service server 11 (81). The rank ID may be set for the terminal A 1 in advance, or may be input thereto by the user.

When receiving the user registration data transmitted by the terminal A 1, the service server 11 refers to the rank management table 30 to acquire the service ID corresponding to the rank included in the received user registration data. Specifically, the service server 11 acquires all the service IDs registered in the service ID 302 of the entry in which the rank ID registered in the rank 301 of the rank management table 30 matches the rank ID included in the received user registration data.

Then, the service server 11 refers to the service management table 19 to acquire the application ID corresponding to the acquired service ID and the virtual device ID included in the received user registration data.

Then, the service server 11 registers the user ID and the virtual device ID that are included in the received user registration data and the acquired application ID in the user registration management table 18. Specifically, the service server 11 adds a new entry to the user registration management table 18, registers the user ID included in the received user registration data in the user ID 181 of the added entry, registers the virtual device ID included in the received user registration data in the virtual device ID 182 of the added entry, and registers the acquired application ID in the application ID 183 of the added entry.

Accordingly, the application 4 that has generated the anonymous personal data that can be used can be designated based on the rank of the user.

(Third Embodiment)

A third embodiment of this invention is described with reference to FIG. 14.

In the third embodiment, by carrying out the user registration after uninstalling the application 4, it is possible to consolidate even the anonymous personal data generated by the uninstalled application 4 into the user ID.

Figure 14:
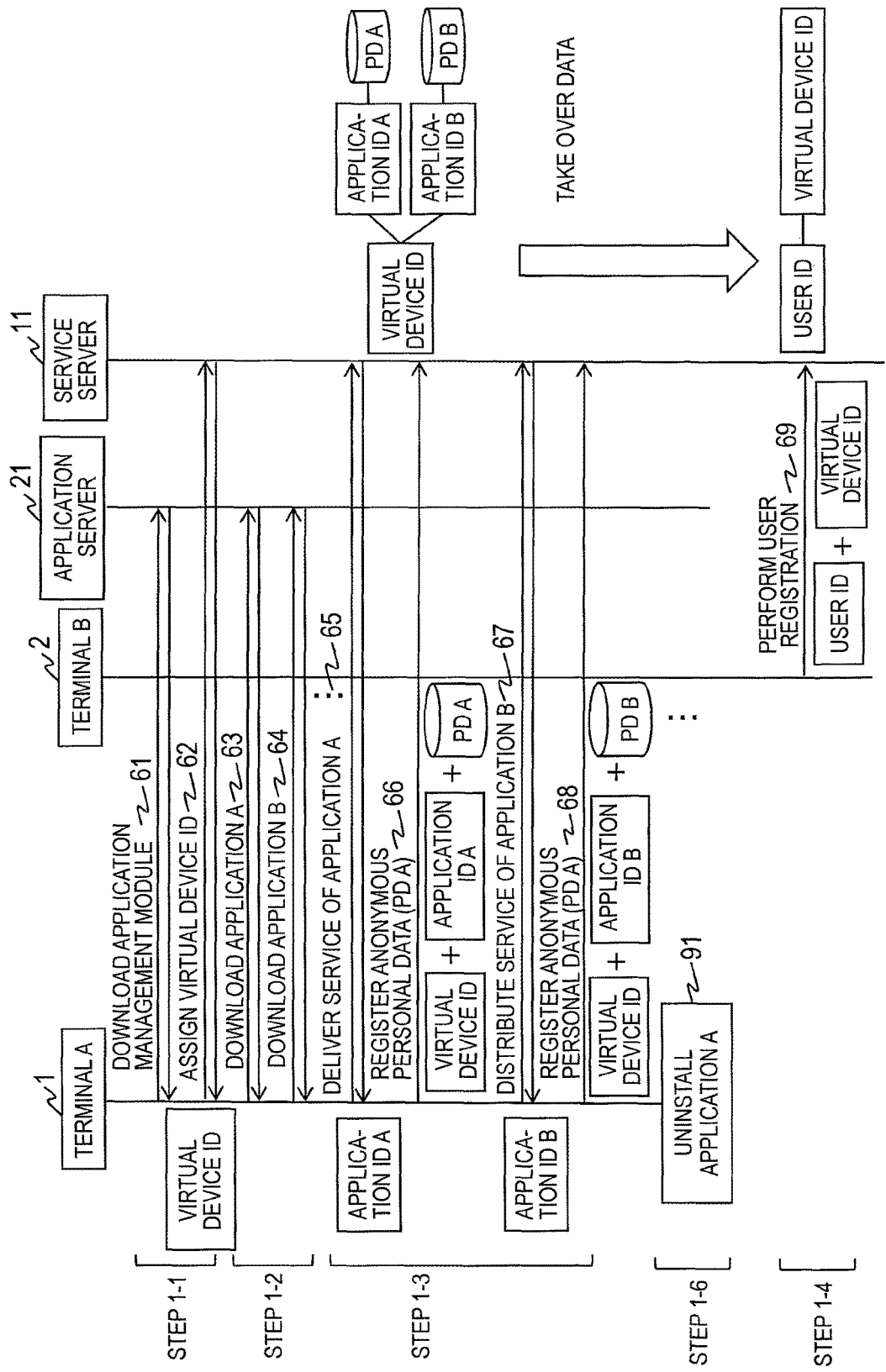
FIG. 14 is a sequence diagram of service providing processing according to a third embodiment of this invention.

FIG. 14 is a sequence diagram of service providing processing according to the third embodiment of this invention.

In the processing illustrated in FIG. 14, the same processing steps as those of the service providing processing according to the first embodiment illustrated in FIG. 6 are denoted by the same reference numerals, and descriptions thereof are omitted.

In FIG. 14, after, in Step 1-3, the service server 11 stores the anonymous personal data on the applications 4A and 4B in the anonymous personal data storage module 17, the terminal A 1 uninstalls the application 4A in Step 1-6 (91).

Then, after the terminal A 1 uninstalls the application 4A, in Step 1-4, the user carries out the user registration from the terminal B 2.

In Step 1-4, the terminal B 2 transmits the user registration data including the user ID, the password, and the virtual device ID that have been input from the user to the service server 11.

When receiving the user registration data, the service server 11 registers the received user ID and virtual device ID in the user registration management table 18.

Therefore, even if the terminal A 1 uninstalls the application 4, the anonymous personal data generated by the application 4 is not deleted from the anonymous personal data storage module 17 of the service server 11, and hence it is possible to consolidate the anonymous personal data generated by the uninstalled application 4 into the user ID.

Therefore, it is also possible to use the anonymous personal data generated by the application 4 uninstalled from the terminal A 1 after the user registration.

It should be noted that FIG. 14 illustrates the example in which the third embodiment is applied to the first embodiment, but the third embodiment can also be applied to the second embodiment.

This invention is not limited to the embodiments described above and encompasses various modification examples. For instance, the embodiments given above are detailed descriptions intended for easier understanding of this invention, and this invention is not limited to a mode that has all of the components described above. To give another example, while one time slave is provided in one base in the time synchronization systems according to the embodiments described above, it should be understood that this invention is applicable also to a configuration in which one base is provided with a plurality of time slaves.

Some of or all of the components, functions, processing parts, processing measures, and the like described above may be implemented by hardware by, for example, designing those in the form of an integrated circuit. Alternatively, the components, functions, and the like described above may be implemented by software by having a processor interpret and execute programs that respectively implement the above-mentioned functions. Programs, tables, files, and other types of information for implementing the above-mentioned functions can be put in a memory, a recording device such as a hard disk or a solid state drive (SSD), or a recording medium such as an IC card, an SD card, or a DVD.

What is claimed is:

1. A service provision system for providing a service to a user, comprising:
   a first terminal used by the user;
   a service computer for providing the service and storing anonymous personal data received from the first terminal; and
   a user registration module coupled to the service computer for receiving an input for user registration,
   wherein the first terminal and the service computer include a processor and a memory,
   wherein:
      the first terminal includes:
         an application execution module for providing the service and executing an application to which first identification information is assigned;
         an application management module to which second identification information is assigned, for managing the application;
         an anonymous personal data transmission module for transmitting the anonymous personal data generated by the application execution module executing the application to the service computer by including therein the first identification information and the second identification information; and
         a first identification information assigning module for acquiring the first identification information by using one of a first method and a second method in a case where the application is first executed by the application execution module, and assigning the acquired first identification information to the application;
      the user registration module acquires the second identification information in a case where third identification information serving as identification information on the user is input for the user registration, and transmits user registration data including the acquired second identification information and the input third identification information to the service computer; and
      the service computer includes:
         an anonymous personal data storage module for storing, in a case of receiving the anonymous personal data transmitted by the anonymous personal data transmission module, the first identification information and the second identification information that are included in the anonymous personal data and the anonymous personal data in a storage area in association with each other; and
         an anonymous personal data consolidation module for storing, in a case of receiving the user registration data transmitted by the user registration module, the second identification information and the third identification information that are included in the user registration data in association with each other, to thereby consolidate the anonymous personal data into the third identification information;

wherein:

in the first method:

the first identification information assigning module transmits, to the service computer, a first identification information acquisition request for acquiring the first identification information in case where the application is first executed;

the service computer generates the first identification information in a case of receiving the first identification information acquisition request, and transmits the generated first identification information to the first terminal; and the first identification information assigning module receives and acquires the first identification information from the service computer; and in the second method, the first identification information assigning module generates and acquires the first identification information in a case where the application is first executed.

2. The service provision system according to claim 1, wherein:

the user registration module transmits, after the application is uninstalled from the first terminal, the user registration data to the service computer; and the anonymous personal data consolidation module stores, in a case of receiving the user registration data, the second identification information and the third identification information that are included in the user registration data in association with each other, to thereby consolidate the anonymous personal data on the uninstalled application into the third identification information.

3. The service provision system according to claim 1, wherein:

the user registration module transmits, to the service computer, the user registration data further including application-identifiable information that allows the application to be identified, in order to place a limit to the application generating the anonymous personal data to be consolidated into the third identification information by the anonymous personal data consolidation module; and the anonymous personal data consolidation module is configured to:

search the anonymous personal data stored in the storage area for the anonymous personal data generated by the application identified by the application-identifiable information included in the user registration data; and consolidate the retrieved anonymous personal data into the third identification information.

4. The service provision system according to claim 1, further comprising a third terminal including the user registration module.

5. The service provision system according to claim 4, wherein:

the first terminal displays the second identification information in a case of receiving a predetermined operation from the user; and the user registration module receives an input of the second identification information from the user, to thereby acquire the second identification information.

6. The service provision system according to claim 4, wherein the user registration module receives the second identification information from the first terminal via one of wireless communications, wired communications, and a nonvolatile storage area, to thereby acquire the second identification information.

7. The service provision system according to claim 4, wherein:

the first terminal transmits, to the service computer, an issuance request for identification information with an expiration date, which is unique only during a predetermined time period, by including therein the second identification information;

the service computer generates, in a case of receiving the issuance request, the identification information with the expiration date having a smaller number of digits than that of the second identification information, stores the generated identification information with the expiration date and the second identification information included in the received issuance request in association with each other, and transmits the generated identification information with the expiration date to the first terminal that has transmitted the issuance request;

the first terminal that has received the identification information with the expiration date displays the identification information with the expiration date;

the user registration module transmits, in a case of receiving an input of the third identification information and the displayed identification information with the expiration date, the user registration data including the identification information with the expiration date instead of the second identification information to the service computer; and the anonymous personal data consolidation module is configured to:

identify, in a case of receiving the user registration data, the second identification information associated with the identification information with the expiration date included in the user registration data; and store the identified second identification information and the third identification information in association with each other.

8. The service provision system according to claim 1, wherein the first terminal is configured to execute a plurality of the applications, and includes the user registration module.

9. The service provision system according to claim 8, further comprising a third terminal for presenting the user with a message for prompting the user to input the third identification information to the user registration module provided to the first terminal.

10. A service provision system for providing a service to a user, comprising:

a first terminal used by the user;

a service computer for providing the service and storing anonymous personal data received from the first terminal; and a user registration module coupled to the service computer for receiving an input for user registration, wherein the first terminal and the service computer include a processor and a memory, wherein:
the first terminal includes:
an application execution module for providing the service and executing an application to which first identification information is assigned;
an application management module to which second identification information is assigned, for managing the application; and
an anonymous personal data transmission module for transmitting the anonymous personal data generated by the application execution module executing the application to the service computer by including therein the first identification information and the second identification information;
a second identification information assigning module for acquiring the second identification information by using one of a third method and a fourth method in a case where the application management module is first executed, and assigning the acquired second identification information to the application management module;
the user registration module acquires the second identification information in a case where third identification information serving as identification information on the user is input for the user registration, and transmits user registration data including the acquired second identification information and the input third identification information to the service computer; and
the service computer includes:
an anonymous personal data storage module for storing, in a case of receiving the anonymous personal data transmitted by the anonymous personal data transmission module, the first identification information and the second identification information that are included in the anonymous personal data and the anonymous personal data in a storage area in association with each other; and
an anonymous personal data consolidation module for storing, in a case of receiving the user registration data transmitted by the user registration module, the second identification information and the third identification information that are included in the user registration data in association with each other, to thereby consolidate the anonymous personal data into the third identification information;
wherein:
in the third method:
the second identification information assigning module transmits, to the service computer, a second identification information acquisition request for acquiring the second identification information in a case where the application management module is first executed;
the service computer generates the second identification information in a case of receiving the second identification information acquisition request, and transmits the generated second identification information to the first terminal; and
the second identification information assigning module receives and acquires the second identification information from the service computer; and
in the fourth method, the second identification information assigning module generates and acquires the second identification information in a case where the application management module is first executed.

11. A service provision system for providing a service to a user, comprising:
a first terminal used by the user;
a service computer for providing the service and storing anonymous personal data received from the first terminal;
a second terminal used by the same user as the first terminal; and
a user registration module coupled to the service computer for receiving an input for user registration,
wherein the first terminal, the second terminal and the service computer include a processor and a memory,
wherein:
the first terminal includes:
an application execution module for providing the service and executing an application to which first identification information is assigned;
an application management module to which second identification information is assigned, for managing the application; and
an anonymous personal data transmission module for transmitting the anonymous personal data generated by the application execution module executing the application to the service computer by including therein the first identification information and the second identification information;
the user registration module acquires the second identification information in a case where third identification information serving as identification information on the user is input for the user registration, and transmits user registration data including the acquired second identification information and the input third identification information to the service computer; and
the service computer includes:
an anonymous personal data storage module for storing, in a case of receiving the anonymous personal data transmitted by the anonymous personal data transmission module, the first identification information and the second identification information that are included in the anonymous personal data and the anonymous personal data in a storage area in association with each other; and
an anonymous personal data consolidation module for storing, in a case of receiving the user registration data transmitted by the user registration module, the second identification information and the third identification information that are included in the user registration data in association with each other, to thereby consolidate the anonymous personal data into the third identification information;
wherein:
the second terminal includes the application execution module, the application management module, and the anonymous personal data transmission module;
the user registration module transmits, after the anonymous personal data associated with the second identification information on the first terminal is consolidated into the third identification information on the user by the anonymous personal data consolidation module, the user registration data including the third identification information on the user and the second identification information on the second terminal to the service computer; and
the anonymous personal data consolidation module stores, in a case of receiving the user registration data after the anonymous personal data associated with the second identification information on the first terminal is consolidated into the third identification information on the user, the second identification information on the second terminal and the third identification information that are included in the received user registration data in association with each other.

\* \* \* \* \*